United States Patent [19]
Craig

[11] 4,435,966
[45] Mar. 13, 1984

[54] MOTORCYCLE SADDLE BAG LOCK
[75] Inventor: Clark E. Craig, Rockford, Ill.
[73] Assignee: Keystone Consolidated Industries, Inc., Peoria, Ill.
[21] Appl. No.: 376,182
[22] Filed: May 7, 1982
[51] Int. Cl.³ ............... B65D 55/14; E05C 5/00
[52] U.S. Cl. ........................... 70/161; 70/360; 220/210; 292/110; 292/336.3; 292/DIG. 37; 292/DIG. 72
[58] Field of Search .................. 70/158–163, 70/125, 127, 128, 360, 63; 292/DIG. 4, DIG. 72 292/DIG. 37, 336.3, DIG. 65, 110, 111, 64, 65, 292/127; 220/210

[56] References Cited
U.S. PATENT DOCUMENTS
2,221,095 11/1940 Jacobi .................. 292/DIG. 37
2,939,734 6/1960 Claud-Mantle ............... 292/64
3,964,280 6/1976 Kelton .................. 70/360 X
4,306,431 12/1981 Craig .................. 70/162 X

*Primary Examiner*—Gary L. Smith
*Assistant Examiner*—Lloyd A. Gall
*Attorney, Agent, or Firm*—Allegretti, Newitt, Witcoff & McAndrews, Ltd.

[57] ABSTRACT

A lock for a motorcycle saddle bag container includes a key operated plug attached to a lock housing mounted on the inside wall of the container. The plug operates a pivotal and transversely movable shutter. The shutter, in turn, cooperates with a strike attached to the inside of the lid for the container. A rubber seal maintains the shutter and strike in a locked position until the lid is manually depressed to compress the seal and release the shutter from the strike.

5 Claims, 7 Drawing Figures

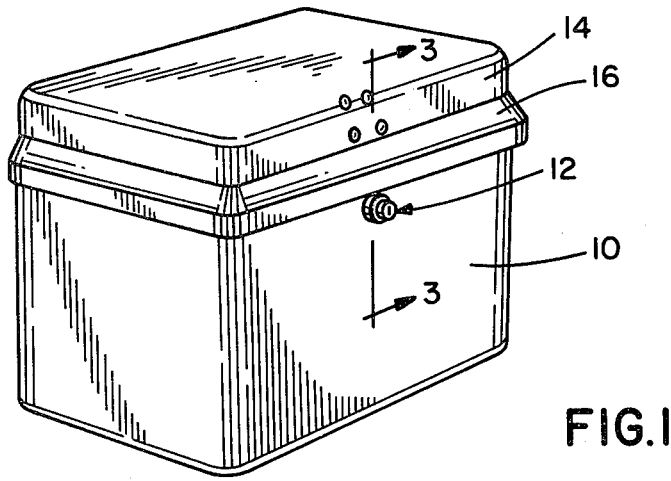
FIG.1
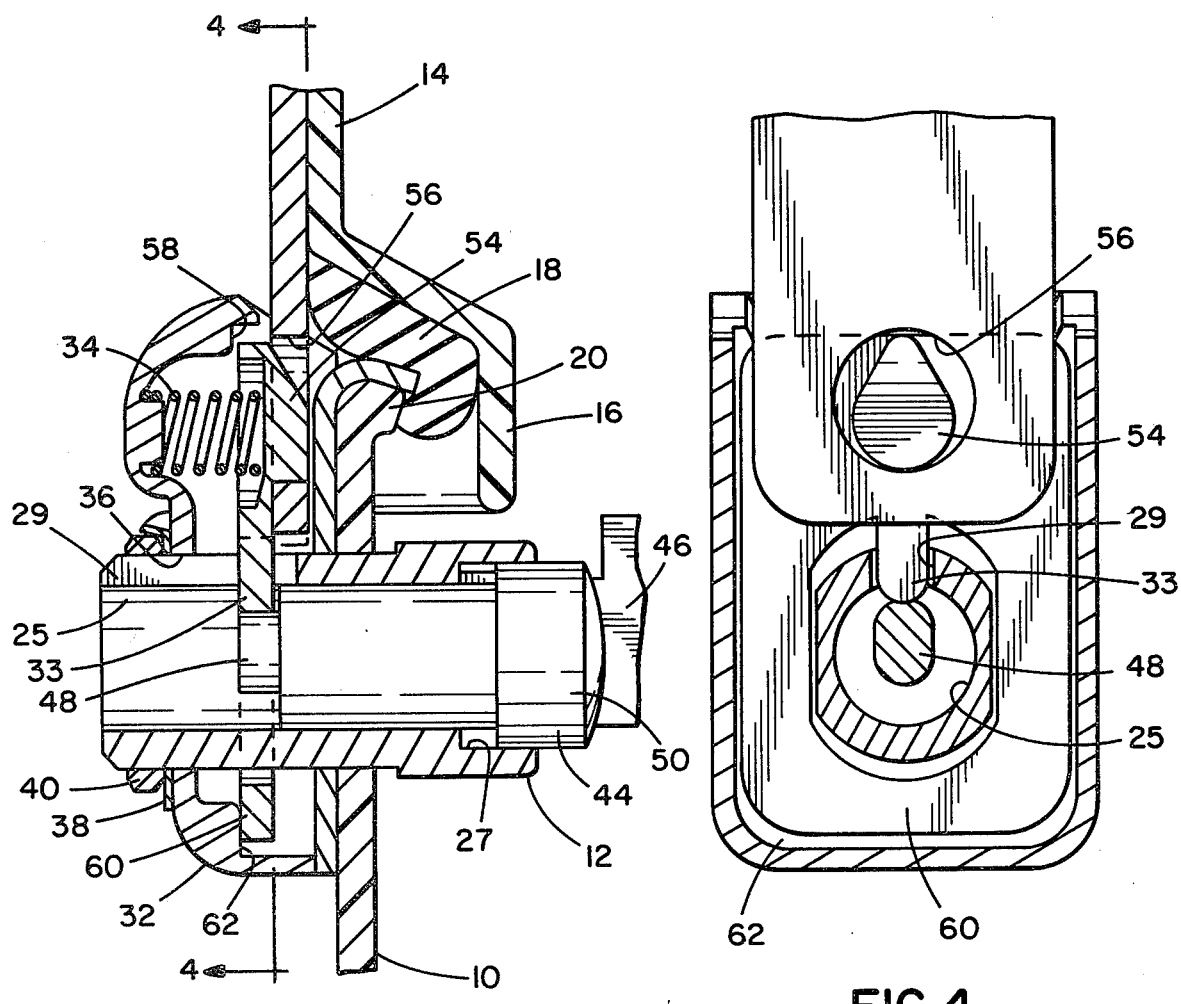
FIG.3
FIG.4

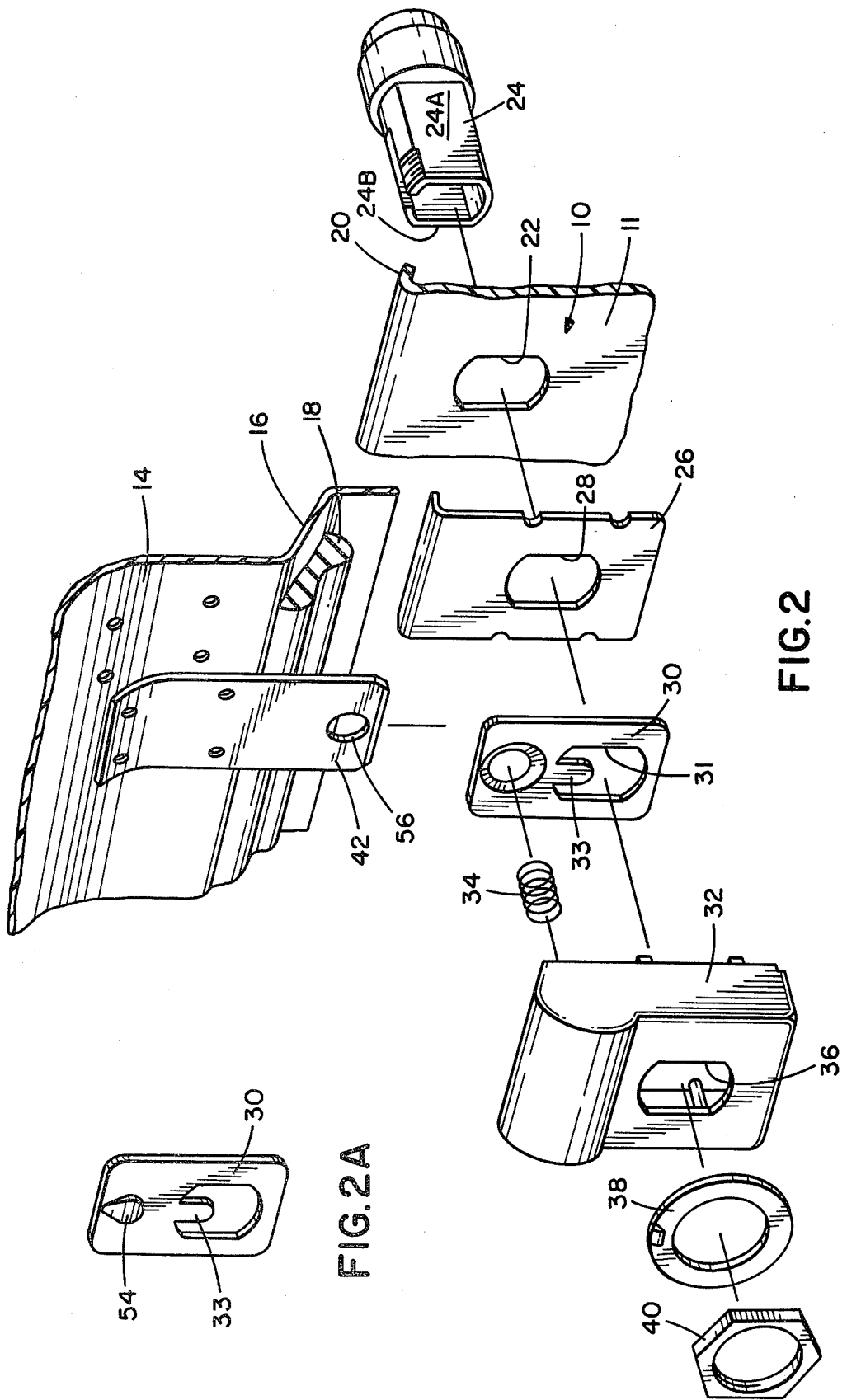

MOTORCYCLE SADDLE BAG LOCK

BACKGROUND OF THE INVENTION

In a principal aspect, the present invention relates to a latch and lock mechanism which is especially useful for latching and retaining the lid of a container, for example, the lid of a molded plastic saddle bag for a motorcycle.

Storage containers or "saddle bags" for motorcycles are often attached to the frame of the motorcycle and suspended on the opposite sides of the rear wheel. Because such containers are easily accessible, it is desirable to provide some type of security or lock for the containers.

Often such containers are fabricated from a molded plastic and thus are substantially rigid. Also, such containers are usually waterproof or, at least, water resistant. Thus, when the lid is closed on the container, the lid must be tightly closed and retained in a tightly closed position by the latch and lock mechanism for the container. Often a seal is provided where the lid fits on the container.

Unless the seal on the container and lid are properly dimensioned, however, the lid may be difficult to close and open. Moreover, in circumstances where the latch is not locked, the latch may accidentally release the lid from the container. Such release is not desirable and is to be avoided. It is against this background that the present invention was developed.

SUMMARY OF THE INVENTION

Briefly, the latch and lock mechanism of the present invention is a pushbutton operated latch and lock which is attached to the top edge of a rigid container and cooperates with a strike attached to the lid of the container. A housing for the lock is attached to the inside wall of the container. A fixed cylinder with a pushbutton plug projects through the container wall and is retained by the housing. A shutter is provided in the housing for cooperation with the pushbutton plug. The shutter can engage the strike attached to the lid. The housing includes a special land or flanged surface which can cooperate with the shutter whenever the shutter is in the latched position to prevent release of the shutter from the strike. This cooperation results whether the lock is locked or unlocked. Thus, to unlatch the shutter from the strike, the lid must be manually depressed against an elastomeric spacer between the lid and the container edge to, in turn, depress and release the shutter from the flange surface of the housing and permit the shutter to be disengaged from the strike.

Thus it is an object of the present invention to provide an improved latch and lock mechanism with a feature that prevents accidental unlatching even when the mechanism is in the unlocked position.

A further object of the present invention is to provide a latch and lock mechanism particularly useful in combination with a container of the type having a lid with an elastomeric seal between the lid and the container.

Still a further object of the present invention is to provide an improved latch and lock mechanism having a minimum number of parts which provides high security, is reliable, and inexpensive to manufacture.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 1 is a perspective view of a typical container of the type which incorporates the latch and lock mechanism of the present invention;

FIG. 2 is an exploded perspective view of the mechanism of the present invention;

FIG. 2A is a perspective view of the opposite side of the shutter of the mechanism of the invention;

FIG. 3 is a side cross sectional view of the mechanism of the present invention taken substantially along the line 3—3 in FIG. 1;

FIG. 4 is a front cross sectional view taken substantially along the line 4—4 in FIG. 3;

DESCRIPTION OF THE PREFERRED EMBODIMENT

Figure 5:
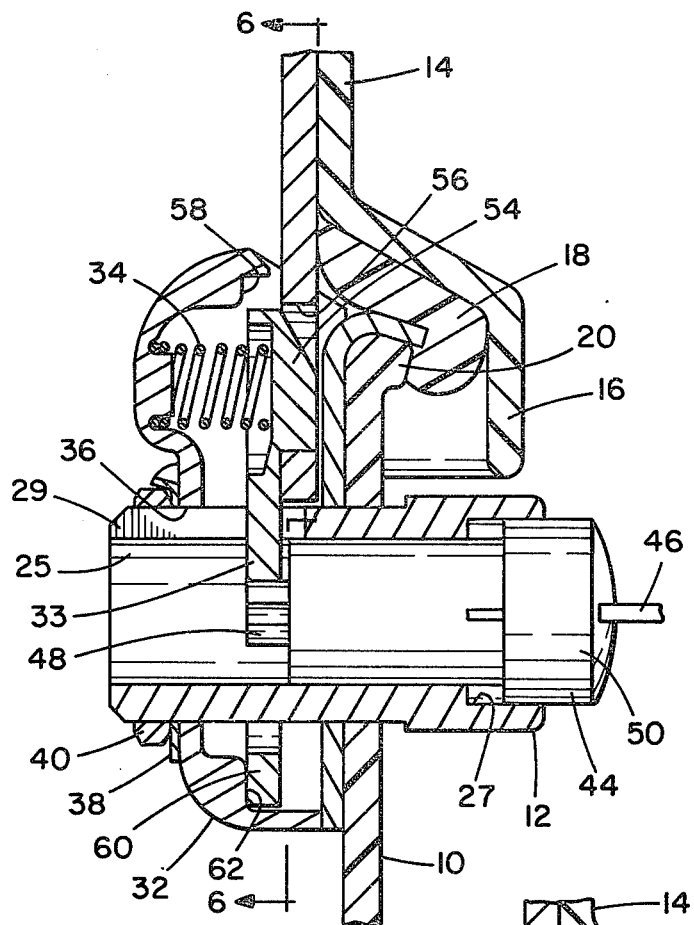
FIG. 5 is a side cross sectional view of the mechanism of the present invention as the mechanism is being latched and is similar to FIG. 3.

The lock of the present invention is generally attached to the side wall 11 of a container 10 as shown in FIG. 1. Container 10 may, for example, be a molded plastic container 10 with a molded plastic lid 14 and an elastomeric seal 18 where the lid 14 interfaces with top edge 20 of container 10. The lock 12 in FIG. 1 is inserted in the wall 11 of the container 10 along the top edge 20 of the wall 11.

The lid 14 includes a circumferential skirt 16 which fits over or covers the top edge 20 of the container 10 and prevents the moisture from entering the container 10 when the lid 14 and container 10 are in the closed position as shown in FIG. 1. Attached to the inside of the skirt 16 is a circumferential seal 18 as shown in FIG. 3 which cooperates with top edge 20 of container 10 to seal the lid 14 to the container 10.

FIG. 2 further illustrates the manner in which the lid 14 and container 10 cooperate with the lock mechanism 12. The container 10 includes an opening 22 which receives a fixed cylinder 24. The opening 22 is flat sided to cooperate with flat sides 24A and 24B of cylinder 24 and thereby maintain the cylinder 24 aligned in opening 22 by preventing rotation thereof.

A mounting plate 26 has a keyed opening 28 identical to opening 22 for receipt of cylinder 24. Mounting plate 26 fits flush against wall 11.

A shutter 30 is retained within a housing 32. The shutter 30 is biased by spring 34 toward the plate 26. Housing 32 and shutter 30 each include openings 36 and 31, respectively, for receipt of the cylinder 24 which projects through all the openings 22, 28, 31, 36. Note that the opening 31 is elongated with respect to the body of the cylinder 24 so that the shutter 30 may be displaced in a vertical direction transverse to the axis of cylindrical plug 24. A lock washer 38 fits over the end of cylinder 24 and a lock nut 40 retains the cylinder 24 and the assembly on the wall 11 of container 10 in the arranged sequence shown.

A strike 42 is attached to the lid 14 for cooperation with shutter 30. Strike 42 projects downward and includes an opening 56 for cooperation with shutter 30.

Turning now to the remaining figures and in particular FIG. 3, the cylinder 24 includes a key actuated, rotatable, cylinder shaped plug 44 with an oval shaped drive cam 48 at the inside end and a head 50 at the opposite or outside end. Plug 44 may be rotated about its longitudinal axis by a key 46 to a locked or unlocked position. In FIG. 3, the key 46 is in the locked position. Plug 44 is also translatable in an axial direction. Thus, the plug 44 is both axially translatable and rotatable within the cylindrical passage 25 in cylinder 24. Axial translation inward is limited by the plug head 50 which fits within counterbore opening 27 of cylinder 24. The inside end of plug 44 cooperates with shutter 30, and more particularly a tab 33 of shutter 30 projects downward into opening 31 and through a longitudinal slot 29 in cylinder 24 where it cooperates with the cam 48 and the end of the plug 44.

The shutter 30 is normally biased by the spring 34 toward the plug 44. Shutter 30 thus pivots about its lower end 60 where it rests against a flange surface 62. Also, shutter 30 may be moved or slid in a direction transverse to the axis of plug 44 by actuation of cam 48 against tab 33. The shutter 30 thus slides upward or downward in response to rotation of the oval shaped cam 48. Regardless of the direction of movement (pivotal or transverse), shutter 30 is maintained in alignment by cooperating tab 33 and slot 29.

FIG. 3 and FIG. 4 illustrate how the plug 44 may be rotated so that the oval shaped cam surface 48 drives the shutter 30 upwardly and into a locked position. In the position depicted in FIG. 3, a lip or latch 54 of the shutter 30 cooperates with opening 56 in the strike 42. The latch 54 thus holds the container lid 14 in a locked position. When in this position, the lid 14 is retained at a tolerance or position where the elastomeric or rubber seal 18 is compressed slightly and the shutter 30 is pulled upward in a transverse direction to a maximum limit of travel of shutter 30. This limit is determined by the engagement of the bottom of opening 31 with the under surface of cylinder 24. Shutter 30 is thus moved beyond the extent of travel imparted by the plug 44 in response to actuation of key 46. Importantly in this position the shutter 30 is positioned to lie over a land or flange surface 58 which limits or prevents the pivotal motion of the shutter 30 and thus prevents unlatching of latch 54.

Figure 6:
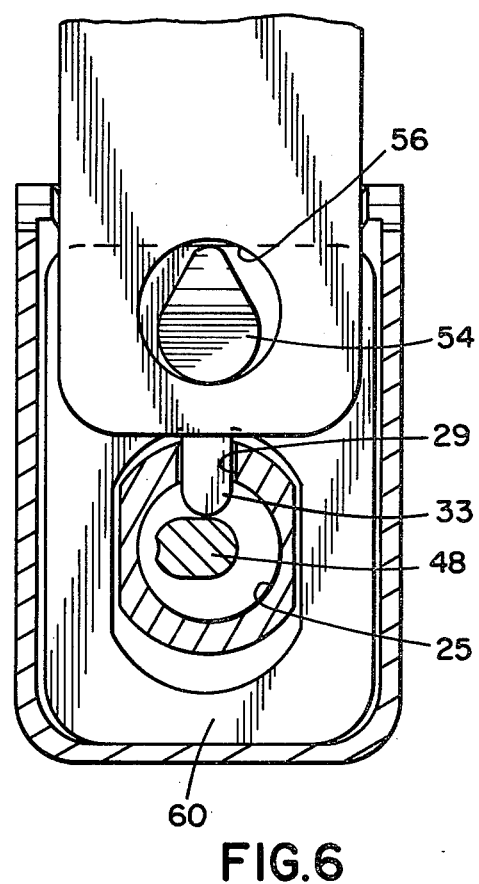
FIG. 6 is a front cross sectional view of the mechanism of FIG. 5 taken substantially along the line 6—6.

Examining the configuration of FIG. 3, when the plug 44 is in the locked position, of course the pushbutton head 50 cannot be depressed to pivot the shutter 30 about its lower end 60 against the surface 62. Assume, however, that the key 46 rotates the plug 44 by 90° to the unlocked position of FIG. 6. In this position, the shutter latch 54 will still be engaged with the strike opening 56 since the elastomeric or rubber seal 18 is compressed and maintains the shutter 30 in the position of FIG. 3.

Figure 7:
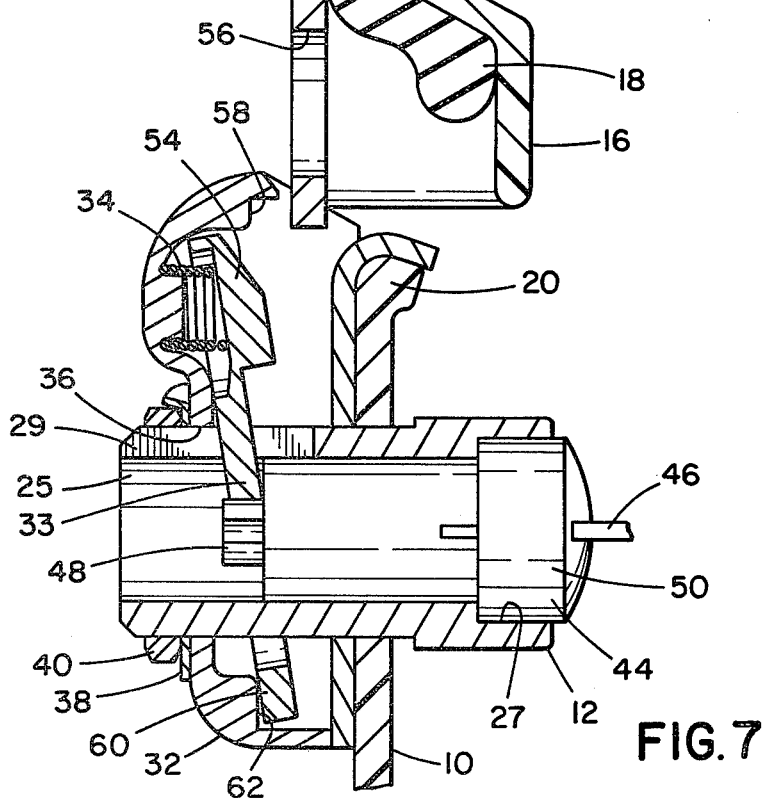
FIG. 7 is a further side cross sectional view of the mechanism illustrating the configuration for opening the lock and is similar to FIGS. 3 and 5.

In order to release the latch 54 from the opening 56 of the strike 42 and disengage the latch 54 from the opening 56, the shutter 30 must be moved downward in a vertical direction against the upward force imparted on it by the compressed seal 18. This can be done by manually pushing downward on the lid 14. A downward movement of lid 14 is illustrated in FIG. 5 wherein the lid 14 has been depressed to cause the strike 42 to move down, engage to the shutter 30 and drive the shutter 30 downwardly in a sliding movement so that it reaches the position shown in FIG. 5. The shutter 30 is released from a position of engagement with the flange or land 58. The pushbutton head 50 may then be depressed as shown in FIG. 7 to move the plug 44 transversely against the shutter 30. The shutter 30 pivots and the latch 54 then disengages from the opening 56. The elastomeric characteristics of seal 18 then cause the lid 14 to pop up.

With the latch mechanism of the present invention, therefore, the mechanism remains in the shut or closed position when the key operated lock is in the locked or unlocked position. Accidental pushing of the pushbutton 50, even when the latch is in the unlocked position, will not open the container 10. In order to open the container 10, it is necessary to push down on the lid 14 to compress seal 18 and simultaneously push in on the button 50 to pivot shutter 30. The mechanism maintains the container 10 in a closed position and prevents unintentional opening of the container.

Thus, while there has been set forth a preferred embodiment of the invention, the invention is to be limited only by the following claims and their equivalents.

What is claimed is:

1. A latch and lock mechanism for use in combination with an open container of the type having a lid cooperating with the open container, said lock mechanism comprising:
   a fixed cylinder for projecting through a container wall adjacent an edge cooperative with the lid;
   a housing cooperative with the fixed cylinder on the inside of the wall to retain the fixed cylinder in position in the wall;
   a shutter mounted in the housing and retained by the housing for limited movement transverse to the axis of the fixed cylinder and pivotal movement about an axis parallel to the edge of the container;
   a key actuated rotatable plug in the cylinder, said plug mounted for rotatable movement and axial movement along the axis of the cylinder, said plug including means engaging the shutter for driving the shutter transversely in response to rotatable movement and pivotally in response to axial movement;
   biasing means for biasing the shutter about the pivotal axis;
   a strike on the lid for receiving the shutter and retaining the shutter; and
   said housing including a land cooperative with the shutter only when the shutter is shifted to a maximum transversely position toward the edge to thereby prevent pivotal movement of the shutter and release of the shutter from the strike.

2. The lock mechanism of claim 1 in combination with a container and lid wherein the lid includes an elastomeric member interposed between the lid and container edge when the lock shutter is engaged with the strike to maintain the shutter in the maximum position, said shutter being releasable upon depression of the lid toward the container and compression of the elastomeric member.

3. The lock mechanism of claim 1 including an oval cross-section shaped drive cam on the inside end of the plug cooperative with the shutter for driving the shutter transversely.

4. The lock mechanism of claim 1 wherein the biasing means comprises a coil spring interposed between the housing and shutter to bias the shutter toward the container wall.

5. The lock mechanism of claim 1 in combination with a container and lid wherein the housing and shutter are mounted on the inside of the container and the strike is mounted on the inside of the lid.

* * * * *